United States Patent
Fleddermann et al.

(10) Patent No.: US 9,630,725 B2
(45) Date of Patent: Apr. 25, 2017

(54) METHOD FOR TESTING A COMPONENT IN A HIGH LIFT SYSTEM OF AN AIRCRAFT

(71) Applicant: Airbus Operations GmbH, Hamburg (DE)

(72) Inventors: Andreas Fleddermann, Hamburg (DE); Vincent Maire, Hamburg (DE); Jan-Arend Van Bruggen, Ottersburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/978,612

(22) Filed: Dec. 22, 2015

(65) Prior Publication Data
US 2016/0176540 A1 Jun. 23, 2016

(30) Foreign Application Priority Data
Dec. 22, 2014 (EP) .................................. 14199892

(51) Int. Cl.
*B64D 45/00* (2006.01)
*B64C 9/32* (2006.01)
*B64C 13/28* (2006.01)
*B64F 5/60* (2017.01)

(52) U.S. Cl.
CPC .............. *B64D 45/00* (2013.01); *B64C 9/323* (2013.01); *B64C 13/28* (2013.01); *B64F 5/60* (2017.01)

(58) Field of Classification Search
USPC ............... 701/3, 33.9; 244/213, 58; 464/139
See application file for complete search history.

(56) References Cited

U.S. PATENT DOCUMENTS

| | | | | |
|---|---|---|---|---|
| 6,224,017 B1* | 5/2001 | Fischer | ................... | B64C 13/28 188/134 |
| 6,349,798 B1* | 2/2002 | McKay | ................... | B60T 17/22 188/1.11 E |
| 6,824,099 B1* | 11/2004 | Jones | ..................... | B64C 13/28 244/203 |
| 8,504,221 B2* | 8/2013 | Roach | .................... | B64C 13/42 244/76 R |
| 9,327,600 B1* | 5/2016 | Nehmeh | .................. | B60L 1/00 |
| 2010/0125380 A1* | 5/2010 | Brueckner | ............. | B64C 13/28 701/3 |

(Continued)

FOREIGN PATENT DOCUMENTS

EP 2727831 A1 5/2014

*Primary Examiner* — Thomas Tarcza
*Assistant Examiner* — Richard Goldman
(74) *Attorney, Agent, or Firm* — Lorenz & Kopf, LLC

(57) ABSTRACT

A method for testing a component in a high lift system of an aircraft comprises the steps of activating a brake coupled with at least one hydraulic motor, commanding a rotation of the at least one hydraulic motor for a predetermined period of time, wherein the brake remains activated, acquiring a sensor output of a motion sensor coupled with a central power control unit for moving a high lift surface during the commanded rotation of the at least one hydraulic motor, determining a motion of the power control unit from the acquired sensor output, comparing the determined motion with a predetermined threshold value, and generating a brake indication signal if the determined motion exceeds the predetermined motion threshold value.

17 Claims, 2 Drawing Sheets

(56) References Cited

U.S. PATENT DOCUMENTS

| | | | |
|---|---|---|---|
| 2010/0282899 A1* | 11/2010 | Heintjes | B64C 13/28 244/99.5 |
| 2012/0312931 A1* | 12/2012 | Recksiek | B64C 9/16 244/203 |
| 2013/0152704 A1* | 6/2013 | Becker | G01B 7/16 73/862.624 |
| 2014/0027568 A1* | 1/2014 | Fleddermann | B64D 41/00 244/58 |
| 2014/0138480 A1* | 5/2014 | Richter | B64C 13/30 244/99.3 |
| 2015/0360769 A1* | 12/2015 | Dege | B64C 13/28 244/213 |
| 2016/0039516 A1* | 2/2016 | Zantz | F16D 3/2233 464/139 |
| 2016/0176540 A1* | 6/2016 | Fleddermann | B64D 45/00 701/33.9 |
| 2016/0362171 A1* | 12/2016 | Lassen | B64C 3/56 |

* cited by examiner

METHOD FOR TESTING A COMPONENT IN A HIGH LIFT SYSTEM OF AN AIRCRAFT

CROSS-REFERENCE TO RELATED APPLICATIONS

This application claims the benefit of the filing date of the European Patent Application No. 14 199 892.2, filed 22 Dec. 2014, the disclosure of which application is hereby incorporated herein by reference.

TECHNICAL FIELD

This relates to a method for testing a component in a high lift system of an aircraft, a high lift system of an aircraft as well as an aircraft having a wing, a hydraulic network, and at least one such high lift system.

BACKGROUND

Typically, high lift systems of commercial and military aircraft are powered by a centralized drive, also known as a power control unit (PCU), which is mounted in a central region of the fuselage, and is controllable through a computerized control. The PCU is coupled with a torque shaft system, also known as transmission shaft, which transfers mechanical power to geared actuators at flap or slat panel drive stations distributed along the trailing edge or leading edge of a wing, depending on the desired type of high lift surfaces. A wing tip brake, which is coupled with the transmission shaft and particularly placed in an outer region of the transmission shaft and/or in a tip region of the respective wing, is capable of arresting and holding the transmission shaft in certain conditions. The control of the PCU is usually conducted by control computers, such as slat flap control computers (SFCC), which are commonly realized as a redundant arrangement of two independent SFCCs that are not only able to control but also to monitor the operation of the high lift system.

A PCU commonly comprises two independent motors, which are coupled with an output shaft by means of a speed summing differential gear. Each of the motors is provided with a power off brake (POB) for arresting the motor in a commanded position. While at least one of the two motors is commonly a hydraulic motor, the second motor may be realized as a further hydraulic motor, but also as an electric motor, leading to a hybrid PCU. The hydraulic motor may preferably be realized by an axial piston motor comprising a movable swash plate, wherein the orientation of the swash plate inter alia determines the resulting speed of the motor. A solenoid valve may be arranged between a hydraulic network of the aircraft and the respective hydraulic motor, leading to a pressurization of the hydraulic motor, and allows the motor to spin when the swash plate is in a desired position.

Still further, high lift systems usually comprise torque limiters that are adapted for limiting the torque to be introduced into the transmission system. The torque limiters may be mechanical or electronic torque limiters, wherein the latter rely on constantly monitoring an introduced torque, taking authority over the motors of the PCU, and initiating a reversal once the torque exceeds a predetermined threshold.

EP 1 685 026 B1 discloses a device for limiting a load in an aircraft high lift system, the system comprising individual segments of landing flap systems and slat flap systems, and a drive unit, wherein signals from at least two position sensors are measured, a reference variable is calculated form the measured signals and compared with a corresponding threshold value pre-determined from a maximum authorized load, and a control signal is generated for limiting the drive power, when at least one of the reference variables reaches or exceeds the threshold value.

EP 2 727 831 A1 discloses a method for transferring hydraulic power between at least two hydraulic systems in an aircraft comprising the steps of connecting two hydraulic displacement machines to a differential gear unit having a common mechanical output, arresting the common mechanical output, and operating the first hydraulic displacement machine in a motor mode under consumption of hydraulic power of the first hydraulic system such that the second hydraulic displacement machine is mechanically rotated in a pump mode and supplies hydraulic power to the second hydraulic system.

SUMMARY

Means for efficiently limiting a torque introduced by a PCU is state of the art. Also, the addition for new functions for components of a PCU without implementing additional components is known. It may be of still further advantage if a PCU driven high lift system has further increased safety and reliability without requiring additional components and while maintaining the above torque limiting function.

It may therefore be an object to propose a high lift system, which comprises a still further increased safety and reliability, preferably accompanied by a minimum or even no additional weight.

A method for testing a component in a high lift system is proposed, the high lift system comprising a central power control unit for moving high lift surfaces arranged at a wing through providing rotational power by means of a transmission shaft to a plurality of drive stations coupled with the high lift surfaces, which power control unit comprises at least one hydraulic motor coupled with a selectively activatable brake, the method having the steps of activating the brake, commanding a rotation of the at least one hydraulic motor for a predetermined period of time, wherein the brake remains activated, acquiring a sensor output of a motion sensor coupled with the central power control unit during the commanded rotation of the at least one hydraulic motor, determining a motion of the power control unit from the acquired sensor output, comparing the determined motion with a predetermined threshold value, and generating a brake indication signal if the determined motion exceeds the predetermined motion threshold value.

In general, the method according to an embodiment constitutes a testing sequence, which allows the determination of any potential dormant undesired conditions that may occur in the high lift system with the above-mentioned setup. This testing sequence is explained in the following.

The high lift system comprises a set of commonly used components. The brake mentioned above is to be considered a power off brake coupled with the at least one hydraulic motor. The term "selectively activatable" includes all possible methods, processes, designs and setups that allow for activation and release of such a power off brake. However, it is common to use a pressure off brake, which is activated unless a certain hydraulic pressure is present at a fluid port of the brake. This means that the respective brake is couplable with a manifold, a hydraulic line and, a valve or another hydraulic component in order to arrest the respective hydraulic motor when the hydraulic pressure drops below a certain limit.

During the testing sequence, the brake is activated. This means that the respective hydraulic motor, which is to be tested, should not be able to induce any rotary motion into the high lift system. The brake is activated by releasing the hydraulic pressure.

Afterwards, a rotation of the at least one hydraulic motor is commanded for a predetermined period of time, wherein the brake remains activated. As explained above, the at least one hydraulic motor should not be able to provide any rotation as the brake remains activated. Concurrently, through a motion sensor at the PCU, e.g. at a common output shaft, the motion of the PCU is monitored. If all components work as desired, the sensor output should approximately be zero and may merely indicate any gear play or inaccuracies of the respective sensor.

Through consideration of a certain geometrical or physical factor, it is possible to determine a motion of the power control unit or a value that represents the motion from the acquired sensor output. The determined motion may be compared with a predetermined threshold value, which should be chosen such that the above-mentioned effects may be compensated for. However, it is clear that if a prominent motion of the power control unit from the acquired sensor output is determined, a brake indication signal is generated. This signal is dedicated for indicating that the brake at a respective hydraulic motor is experiencing an abnormal condition. By receiving a brake indication signal in a control unit of the aircraft, through an indication in the cockpit or any other process that can be brought into dependency on the brake indication signal, maintenance actions can be initiated.

Altogether, the method according to an embodiment provides excellent ability for recognizing any dormant undesired conditions in components of the high lift system of the aircraft, without having to add any further components, sensors, wirings, mechanical means, etc., while the safety and reliability are clearly increased.

In an advantageous embodiment, a previous step may be included into the above method, which comprises moving the high lift system surfaces to a neutral position by rotating the power control unit before activating the brake. Hence, the testing sequence may simply be conducted subsequently after moving the high lift surfaces back into the neutral position right after the aircraft has landed. This may even be conducted during taxiing of the aircraft, while it may also be possible to conduct this method on the ground after reaching a parking position.

Still further, moving the high lift surfaces to the neutral position comprises rotating the at least one hydraulic motor in a first direction of rotation and commanding the rotation of the at least one hydraulic motor comprises rotating the at least one hydraulic motor in a second direction of rotation. The high lift surfaces are moved into a neutral position leading to a clean wing configuration, it is feasible to command the at least one hydraulic motor to rotate into an extension direction. Hence, mechanical stresses introduced into the high lift system during the testing sequence due to end stops or the like are clearly reduced.

In another advantageous embodiment, between moving the high lift surfaces to the neutral position and commanding the rotation of the at least one hydraulic motor, a solenoid valve between a hydraulic network and the at least one hydraulic motor remains activated. Hence, the test sequence may be conducted directly after moving the high lift surfaces to the neutral position. The testing sequence may be a standard addition to a common retraction sequence and, at the same time, allow the elimination of two additional actuations of the respective solenoid valve.

It may be feasible and advantageous to send a speed command to a speed control unit coupled with the at least one hydraulic motor for commanding a rotation of the at least one hydraulic motor. For example, a digitally controlled over-center variable displacement motor may be utilized, wherein the motor control is established by a closed loop layout to maintain speed and torque command inputs. The control algorithms are implemented in the speed control unit, which is provided with all required data to control the hydraulic motor. Hence, commonly used signal paths may be used for conducting the operation of the hydraulic motor during the testing sequence without having to include a separate control logic for the at least one hydraulic motor. The implementation of a core of the method according to the invention may therefore be conducted through modification of software in the control unit, e.g. the SFCC.

As mentioned above, the brake may be a pressure off brake, wherein activating the brake comprises decoupling the brake from a hydraulic network. Hence, a commonly used brake may remain in the high lift system. In the testing sequence a control of the pressure off brake may just be conducted through overriding the usual activation after retraction of the high lift surfaces.

Commanding the rotation of the at least one hydraulic motor for a predetermined period of time may be conducted with a first time delay after the brake is activated. Any reaction times of the brake and of all components between a control unit and the brake can be neglected. However, the first time delay may be extremely short in the range of a few seconds.

Still further, the method may further comprise previous or subsequent steps of detecting a hydraulic pressure between a solenoid valve and the at least one hydraulic motor and generating a valve indication signal the detected pressure is above a predetermined pressure threshold value.

This additional aspect leads to the ability to identify another dormant undesired condition, as a solenoid valve must be able to reliably couple or decouple the at least one hydraulic motor from a hydraulic network. If the solenoid valve is closed such that the at least one hydraulic motor does not experience a hydraulic pressure, a valve indication signal is generated if the pressure remains above a predetermined threshold value. This may happen when the solenoid valve is defective. Should the pressure be too high, resulting in a motor torque above the design limit, the crew will be informed of the presence of a failure preventing the dispatch of the aircraft. Hence, by generating the valve indication signal and initiating appropriate actions in a control unit of the aircraft, in the cockpit or the like, maintenance actions can be initiated.

The embodiments may further relate to a high lift system of an aircraft, comprising a plurality of high lift surfaces movably arrangeable at a wing, a plurality of drive stations coupled with the high lift surfaces, a transmission shaft coupled with the plurality of drive stations, a central power control unit coupled to the transmission shaft for moving the high lift surfaces through driving the drive stations, the power control unit comprising at least one hydraulic motor coupled to a brake and a control unit.

As explained above, the control unit may be adapted for conducting a test sequence comprising activating the brake, commanding a rotation of the at least one hydraulic motor for a predetermined period of time, wherein the brake remains activated, acquiring a sensor output of a motion sensor coupled with the central power control unit during the commanded rotation of the at least one hydraulic motor, determining a motion of the power control unit from the acquired sensor output, comparing the determined motion with a predetermined threshold value, and generating a brake indication signal if the determined motion exceeds the predetermined motion threshold value.

Again, the brake may be a pressure off brake, and activating the brake may comprise decoupling the brake from a hydraulic network.

The control unit may further be adapted for determining a hydraulic pressure between a solenoid valve and the at least one hydraulic motor and generating a valve indication signal if the detected pressure is above a predetermined pressure threshold value.

Still further, the high lift surfaces may be trailing edge flaps or leading edge slats. Commonly, both types of high lift surfaces may be driven by a separate power control unit, such that two of these high lift systems may be integrated into one aircraft and all high lift systems may be able to conduct the method according to the above.

Preferably, the control unit may be integrated into a control computer for controlling the high lift surfaces. Consequently, no additional components are used and the control computer may simply be modified on a software side. Hence, no additional weight arises and the high lift system experiences a clearly increased safety and reliability. Such a control computer may particularly include a slat flap control computer.

The application of the above mentioned features may particularly accompany a high lift system that uses electronic torque limiters.

Still further, this relates to an aircraft having a wing, a hydraulic network, and at least one of the above-mentioned high lift systems.

In this regard, the method according to the above may be conducted for each hydraulic motor in each high lift system integrated into the aircraft, either by a grouped, subsequent or synchronous way.

BRIEF DESCRIPTION OF THE DRAWINGS

Further characteristics, advantages and application options are disclosed in the following description of the exemplary embodiments in the figures. All the described and/or illustrated characteristics per se and in any combination form the embodiments, irrespective of their composition in the individual claims or their interrelationships. Furthermore, identical or similar components in the figures have the same reference characters.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
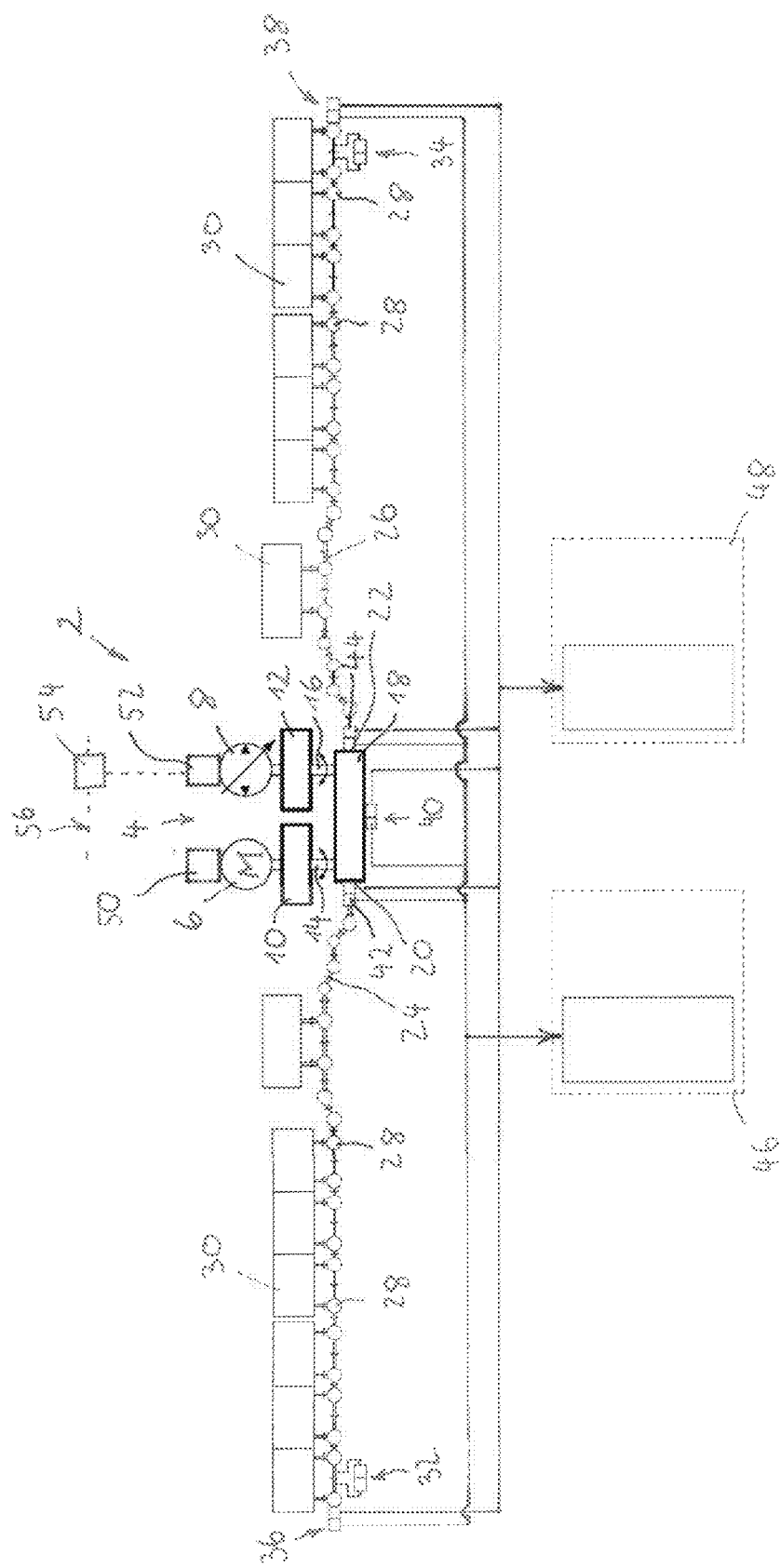
FIG. 1 shows a high lift system in a schematic, block-oriented view.

In FIG. 1, a general setup of a high lift system 2 is shown in an exemplarty leading edge slat system. Here, a power control unit 4 comprises an electric motor 6, a hydraulic motor 8 with a variable displacement, a first power off brake 10 coupled with the electric motor 6 as well as a second power off brake 12 coupled with the hydraulic motor 8. Both motors 6 and 8 rotate an input shaft 14, 16 of a speed summing differential 18, which in turn comprises two output shafts 20, 22, each coupled with a transmission shaft system 24, 26 that extends along a leading edge of a wing half. Each of the transmission shafts 24, 26 is coupled with several drive stations 28 distributed along the respective wing half, wherein each of a plurality of movably supported high lift surfaces 30 is driven by two individual drive stations 28.

Each of the transmission shafts 24, 26 comprises a wing tip brake 32, 34 in a region around the outer end of each of the shafts 24, 26, which may be at an outer end of the respective wing half depending on the extension of the respective shafts 24, 26. Also, each transmission shaft 24, 26 is exemplarily coupled with an asymmetry position pick-off unit 36, 38 arranged at an outermost end of the respective shaft 24, 26 allowing to detect asymmetry conditions between both transmission shafts 24, 26 and, respectively, the drive stations 28 of both wing halves.

The differential 18 may further comprise a feedback position pickoff unit 40 that allows monitoring the rotation of the output shafts 20, 22. Torque sensor units 42, 44 arranged at the output shafts 20, 22 furthermore monitor the torque that is introduced into the output shafts 20, 22.

All of the asymmetry position pickoff units 36, 38, the feedback position pickoff unit 40, and the torque sensor units 42, 44 are coupled with two control units 46, 48, which are exemplarily realized as a first slat flap control computer (SFCC) 46 and a SFCC 48. The torque in the transmission shafts 24, 26 of each wing is exemplarily limited through an electronic torque limiter (ETL) functionality, in which the torque sensor units 42, 44 detect the introduced torque. If the torque in one of the transmission shafts 24, 26 exceeds a certain torque threshold the PCU motors are stopped and, exemplarily, a rapid speed reversal is conducted, leading to controlling the torque to an uncritical level. Finally the system 2 may be arrested through engaging the brake 10 or 12 of the corresponding motor 6, 8.

The electric motor 6 may be a brushless motor controlled through a digital drive control 50, coupled with the SFCCs 46 and 48. The hydraulic motor 8 is controlled through a hydraulic valve block 52, which is coupled with a manifold 54 connected to the SFCCs 46 and 48 and a hydraulic network 56 and contains all required components, such as an enabling solenoid valve and a pressure off brake solenoid valve to pressurize the hydraulic motor 8 and to control the pressure off brake 12. In a default high lift operating mode, the wing tip brakes 32, 34 are released and the PCU 4 is provides sufficient mechanical power to operate the high lift system 2 with a commanded speed into any gated position.

Figure 2:
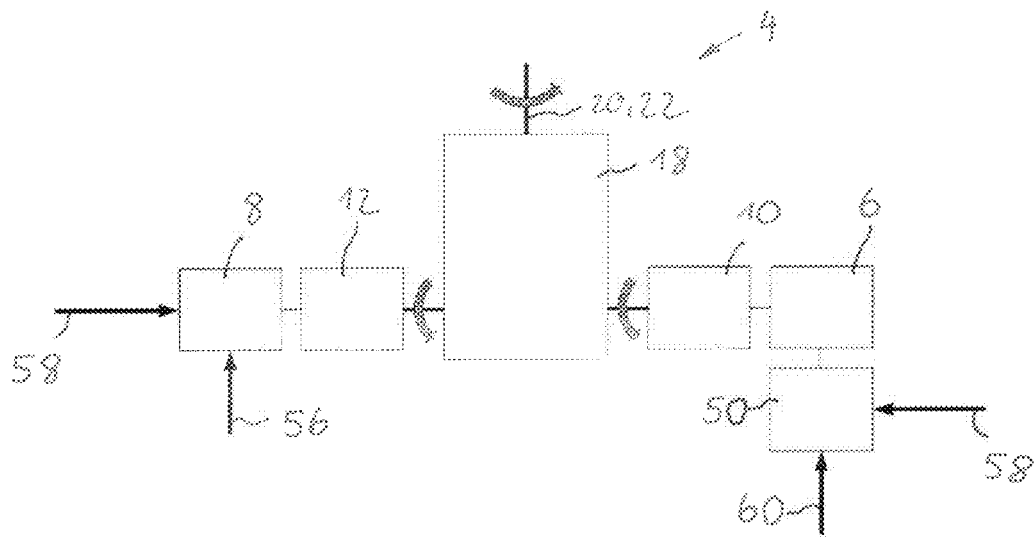
FIG. 2 shows a schematic view of a power control unit.

FIG. 2 depicts the PCU 4 in another, schematic view. Here, the electric motor 6 and the hydraulic motor 8 are coupled with the differential 18 through power off brakes 10 and 12, respectively. The torque and hence the speed of the hydraulic motor 8 is controlled by commanding a motor swash plate into a required position, while the hydraulic power is provided by the associated hydraulic network 56. The motor flow demand is, as part of a closed loop control algorithm, limited with the objective not to overload the hydraulic network. This may require information regarding the hydraulic pressure provided by a pressure transducer as part of a hydraulic drive channel and pressure data provided by the hydraulic network to the SFCC 46 and 48, respectively. The hydraulic motor 8 may thereby be coupled with a controller interface 58. The electric motor 6, which is supplied with electric power through an electric network 60, is controllable by means of closed loop speed control accordingly.

Figure 3:
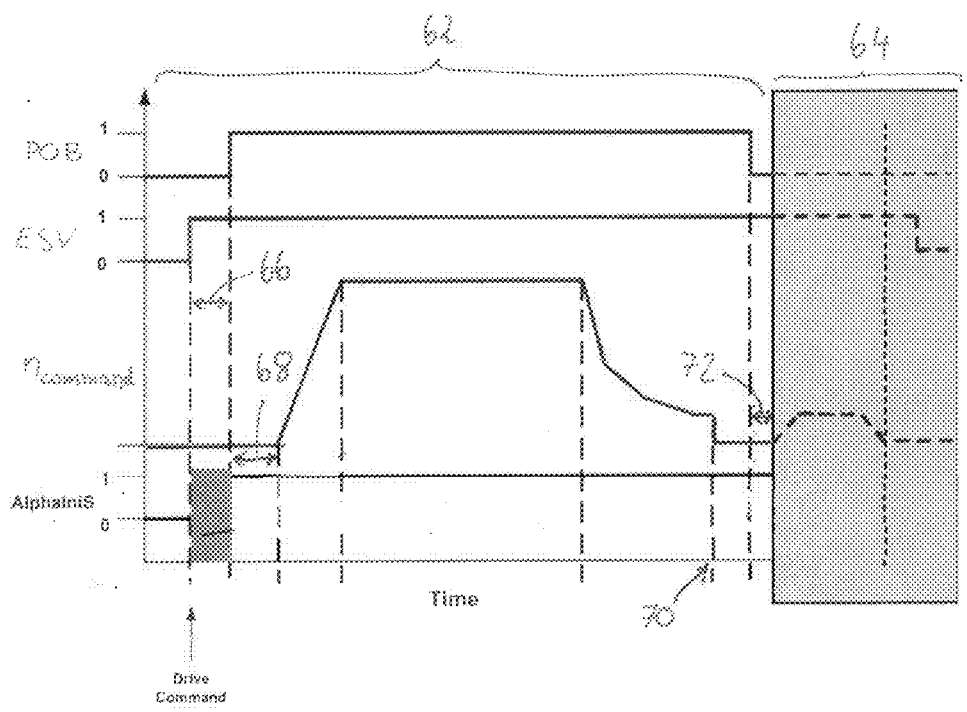
FIG. 3 shows a drive sequence in a diagrammatic view.

FIG. 3 shows a complete drive sequence, which comprises a common drive sequence 62 as well as an additional testing sequence 64 according to the method. Several signals or actions are shown in a single diagram under using the same timeline.

The uppermost curve, which is marked with "POB" shows the action of the power off brake 12, which is a pressure off brake, wherein its action is illustrated through the values "0" and "1". The value "0" stands for an activated brake 12 with no hydraulic pressure applied to it, while "1" stands for a deactivated brake 12 with a certain hydraulic pressure applied to it. In the deactivated state, the power off brake 12 should allow a movement of the power control unit 4.

The curve below, which is marked with "ESV", shows a state of an enable solenoid valve, which may illustrated through the values "0" and "1", wherein "0" stands for a closed valve, leading to a lack of pressure at the at least one hydraulic motor 8 and wherein "1" stands for application of the full hydraulic pressure at the at least one hydraulic motor 8, which may then initiate a rotation if the swash plate is in an appropriate position.

The curve below, which is marked with "$n_{command}$" resembles a commanded speed of the at least one hydraulic motor 8, which is a continuous signal. At the beginning and at the end of each sequence, the commanded speed is 0, which stands for a non-rotating hydraulic motor 8. It can be recognized that the sequence of commanded speed leads to a motion of the high lift surfaces 30, e.g. into a retraction direction.

The lowermost curve, which is marked with "AlphalniS" provides information as to whether the swash plate is at the commanded position to allow motor startup. The motor is then capable of withstanding external loads when the power off brake 12 is released. If AlphalniS is "1" it means that the commanded position is reached, which is required for the actual flight state. If AlphalniS is "0", it means that the commanded position is not reached.

The common sequence 62 may be initiated directly after landing, when the high lift surfaces 30 are still extended. Hence, the solenoid valve integrated in the hydraulic valve block 52, is opened. After a second time delay 66, the power off brake 12 is deactivated, i.e. a pressure is applied to the power off brake 12. After a further, third time delay 68, which considers the delay of the power off brake 12, a speed command is initiated, leading to moving the high lift surfaces 30 from an extended position into a neutral position. At a certain time, a target position 70 has been reached, which equals the neutral position. Here, the testing sequence 64 starts.

After reaching the target position 70, the power off brake 12 is activated again, i.e. through decoupling from the hydraulic network 56. Hence, the PCU 4 may not be able to move any more if it does not experience an undesired condition with limited functionality. However, the solenoid valve remains open. After a first time delay 72, which has been explained in the summary of the invention, a rotation of the at least one hydraulic motor 12 is commanded through commanding a speed of the respective motor by means of the SFCCS 46 and 48, respectively. The commanded speed may include a direction of rotation, which would lead to an extension of the high lift surfaces 30. For the purpose of simplification, only the absolute value of the commanded speed is indicated in the diagram of FIG. 3.

However, a rotation of the PCU 4 may only be measured if the power off brake 12 slips. If it does not slip, a dormant undesired condition of the power off brake may be excluded. Vice versa, if the power off brake 12 slips, a rotation of the PCU 4 may be detected by the motion sensor in the form of the feedback position pickoff unit 40 shown in FIG. 1. If the detected motion exceeds a certain threshold, e.g. a rotation of the PCU 4 of 2° or more, a brake indication signal is generated.

The commandment of the rotational speed to the hydraulic motor 8 may be conducted for a couple of seconds, e.g. 3, 4 or 5 seconds, which allows to reliably identify any dormant undesired condition of the power off brake 12.

Right thereafter or before this, the pressure between the solenoid valve and the hydraulic motor 8 may be detected, wherein the SFCCS 46 and 48, respectively, commands a closed solenoid valve. If a hydraulic pressure exceeding a predetermined threshold is detected, a valve indication signal is generated.

Altogether, the high lift system 2 and the method for testing a component in the high lift system 2 allows the detection of hidden undesired conditions of components in the high lift system 2, which may contribute to situations in which the high lift system 2 experiences limited operability. Hence, the safety level of the aircraft is increased without impacting the aircraft weight due to additional components or changed sizing cases. In addition to this safety level increase, the availability of the overall system in flight is unchanged as this system is active only after landing. All of the above mentioned features are implementable into the aircraft only through software changes.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for testing a component in a high lift system of an aircraft, the high lift system comprising a central power control unit for moving high lift surfaces arranged at a wing through providing rotational power by means of a transmission shaft to a plurality of drive stations coupled with the high lift surfaces; which power control unit comprises at least one hydraulic motor coupled with a selectively activatable brake; the method comprising:
    activating the brake,
    commanding a rotation of the at least one hydraulic motor for a predetermined period of time, wherein the brake remains activated,
    acquiring a sensor output of a motion sensor coupled with the central power control unit during the commanded rotation of the at least one hydraulic motor,
    determining a motion of the power control unit from the acquired sensor output, comparing the determined motion with a predetermined threshold value, and generating a brake indication signal of the determined motion exceeds the predetermined motion threshold value.

2. The method of claim 1, further comprising a previous step of moving the high lift surfaces to a neutral position by rotating the power control unit before activating the at least one brake.

3. The method of claim 2, wherein moving the high lift surfaces to the neutral position comprises rotating the at least one hydraulic motor in a first direction of rotation and wherein commanding the rotation of the at least one hydraulic motor comprises rotating the at least one hydraulic motor in a second direction of rotation.

4. The method of claim 2, wherein between moving the high lift surfaces to the neutral position and commanding the rotation of the at least one hydraulic motor a solenoid valve between a hydraulic network and the at least one hydraulic motor remains activated.

5. The method of claim 1, wherein commanding a rotation of the at least one hydraulic motor comprises sending a speed command to a speed control unit coupled with the at least one hydraulic motor.

6. The method of claim 1, wherein the brake is a pressure off brake and wherein activating the brake comprises decoupling the brake from a hydraulic network.

7. The method of claim 1, wherein commanding the rotation of the at least one hydraulic motor for a predetermined period of time is conducted with a first time delay after the brake is activated.

8. The method of claim 1, further comprising previous or subsequent steps of detecting a hydraulic pressure between a solenoid valve and the at least one hydraulic motor and generating a valve indication signal in case the detected pressure is above a predetermined pressure threshold value.

9. The method of claim 1, wherein the method is conducted after landing of the aircraft while or after the high lift surfaces are moved into a neutral position.

10. A high lift system of an aircraft, comprising:
a plurality of high lift surfaces movably arrangeable at a wing,
a plurality of drive stations coupled with the high lift surfaces,
a transmission shaft coupled with the plurality of drive stations,
a central power control unit coupled with the transmission shaft for moving the high lift surfaces through driving the drive stations, the power control unit comprising at least one hydraulic motor coupled and with a brake, and
a control unit,
wherein the control unit is adapted for conducting a test sequence comprising of activating the brake, commanding a rotation of the at least one hydraulic motor for a predetermined period of time, wherein the brake remains activated, acquiring a sensor output of a motion sensor coupled with the central power control unit during the commanded rotation of the at least one hydraulic motor, determining a motion of the power control unit from the acquired sensor output, comparing the determined motion with a predetermined threshold value, and generating a brake indication signal in case the determined motion exceeds the predetermined motion threshold value.

11. The high lift system of claim 10, wherein the brake is a pressure off brake and activating the brake comprises decoupling the brake from a hydraulic network.

12. The high lift system of claim 10, wherein the control unit is further adapted for detecting a hydraulic pressure between a solenoid valve and the at least one hydraulic motor and generating a valve indication signal in case the detected pressure is above a predetermined pressure threshold value.

13. The high lift system of claim 10, wherein the high lift surfaces are trailing edge flaps or leading edge slats.

14. The high lift system of claim 10, wherein the control unit is integrated into a control computer for controlling the high lift surfaces.

15. A method for testing a component in a high lift system of an aircraft, the high lift system comprising a central power control unit for moving high lift surfaces arranged at a wing through providing rotational power by means of a transmission shaft to a plurality of drive stations coupled with the high lift surfaces; which power control unit comprises at least one hydraulic motor coupled with a selectively activatable brake; the method comprising:
activating the brake,
commanding a rotation of the at least one hydraulic motor for a predetermined period of time, wherein the brake remains activated,
acquiring a sensor output of a motion sensor coupled with the central power control unit during the commanded rotation of the at least one hydraulic motor,
determining a motion of the power control unit from the acquired sensor output,
comparing the determined motion with a predetermined threshold value, and
generating a brake indication signal of the determined motion exceeds the predetermined motion threshold value,
moving the high lift surfaces to a neutral position by rotating the power control unit before activating the at least one brake,
wherein moving the high lift surfaces to the neutral position comprises rotating the at least one hydraulic motor in a first direction of rotation and wherein commanding the rotation of the at least one hydraulic motor comprises rotating the at least one hydraulic motor in a second direction of rotation.

16. The method of claim 15, wherein between moving the high lift surfaces to the neutral position and commanding the rotation of the at least one hydraulic motor a solenoid valve between a hydraulic network and the at least one hydraulic motor remains activated, and
wherein commanding a rotation of the at least one hydraulic motor comprises sending a speed command to a speed control unit coupled with the at least one hydraulic motor.

17. The method of claim 16, wherein the brake is a pressure off brake and wherein activating the brake comprises decoupling the brake from a hydraulic network, and
wherein commanding the rotation of the at least one hydraulic motor for a predetermined period of time is conducted with a first time delay after the brake is activated.

* * * * *